United States Patent
Haben et al.

(10) Patent No.: US 11,273,365 B2
(45) Date of Patent: Mar. 15, 2022

(54) BANKRUPTCY BOARD GAME

(71) Applicants: Susen Haben, Rogers, MN (US); William Haben, Rogers, MN (US)

(72) Inventors: Susen Haben, Rogers, MN (US); William Haben, Rogers, MN (US)

( * ) Notice: Subject to any disclaimer, the term of this patent is extended or adjusted under 35 U.S.C. 154(b) by 0 days.

(21) Appl. No.: 16/988,410

(22) Filed: Aug. 7, 2020

(65) Prior Publication Data
US 2022/0040563 A1 Feb. 10, 2022

(51) Int. Cl.
*A63F 3/00* (2006.01)
*A63F 1/04* (2006.01)
*A63F 11/00* (2006.01)
*G06K 7/00* (2006.01)
*G06K 7/08* (2006.01)

(52) U.S. Cl.
CPC ............ *A63F 3/00072* (2013.01); *A63F 1/04* (2013.01); *A63F 3/00138* (2013.01); *A63F 11/0011* (2013.01); *A63F 11/0074* (2013.01); *G06K 7/0021* (2013.01); *G06K 7/082* (2013.01); *A63F 2001/0441* (2013.01); *A63F 2011/0018* (2013.01); *A63F 2011/0088* (2013.01)

(58) Field of Classification Search
CPC .... A63F 3/00072; A63F 1/04; A63F 11/0011; A63F 11/0074; A63F 3/00138; A63F 2001/0441; A63F 2011/0088; A63F 2011/0018; A63F 2011/0016; G06K 7/0021; G06K 7/082
See application file for complete search history.

(56) References Cited

U.S. PATENT DOCUMENTS

| | | | | |
|---|---|---|---|---|
| 2,799,500 A | * | 7/1957 | Zekowski | A63F 5/04 273/454 |
| 3,733,074 A | * | 5/1973 | Daley | A63F 3/00643 273/238 |
| 3,814,637 A | * | 6/1974 | Piazza et al. | B23K 35/3603 148/23 |
| 3,861,686 A | * | 1/1975 | Breslow | A63F 3/00 273/138.1 |
| 4,840,382 A | * | 6/1989 | Rubin | A63F 3/00069 273/256 |
| 4,848,768 A | * | 7/1989 | Barlow | A63F 3/00006 273/141 A |
| 4,948,145 A | * | 8/1990 | Breslow | A63F 3/00069 273/142 R |
| 5,120,065 A | * | 6/1992 | Driscoll | A63F 3/00643 273/237 |
| 5,139,269 A | * | 8/1992 | Peterson | A63F 3/00072 273/256 |
| 5,217,225 A | * | 6/1993 | Dubarry, Jr. | A63F 11/0011 273/141 R |
| 5,332,227 A | * | 7/1994 | Passero | A63F 3/00006 273/141 R |

(Continued)

*Primary Examiner* — Michael D Dennis
(74) *Attorney, Agent, or Firm* — The Iwashko Law Firm, PLLC; Lev Ivan Gabriel Iwashko

(57) ABSTRACT

A bankruptcy board game, including a game board, including a plurality of spaces disposed on a perimeter of the game board, and a plurality of card retaining areas to receive cards thereupon, a spinner unit removably disposed on at least a portion of the game board to control a course of action of at least one player during a game, and a plurality of figurines to move around the plurality of spaces and represent a position of the at least one player on the game board.

4 Claims, 2 Drawing Sheets

(56) References Cited

U.S. PATENT DOCUMENTS

| | | | | |
|---|---|---|---|---|
| 5,474,295 A | * | 12/1995 | Demshuk | A63F 5/04 |
| | | | | 273/141 A |
| 6,220,595 B1 | * | 4/2001 | Callan | A63F 3/00063 |
| | | | | 273/236 |
| 6,322,072 B1 | * | 11/2001 | Mair | A63F 11/0011 |
| | | | | 273/141 R |
| 7,198,271 B1 | * | 4/2007 | Thomas | A63F 3/00 |
| | | | | 273/249 |
| 2005/0137004 A1 | * | 6/2005 | Wood | A63F 3/00643 |
| | | | | 463/11 |
| 2011/0115157 A1 | * | 5/2011 | Filo | A63F 3/00643 |
| | | | | 273/237 |
| 2014/0127648 A1 | * | 5/2014 | Green | A63F 3/00006 |
| | | | | 434/127 |
| 2016/0303468 A1 | * | 10/2016 | Foster | A63F 3/00063 |

* cited by examiner

BANKRUPTCY BOARD GAME

BACKGROUND

1. Field

The present general inventive concept relates generally to a table-top board game, and particularly, to a bankruptcy board game.

2. Description of the Related Art

Board games are a form of entertainment that engage players in a physical medium using playing pieces and a set of rules. One well known board game includes playing pieces moved around a game board using dice and cards to amass the most money by capturing property and building homes and/or hotels on the captured property.

However, the well known board game usually takes hours to win because players attempt to erect structures on their captured property using earned money. As such, many potential players look for other games to play individually to avoid the time and complexity required to compete in the well known board game. Also, many players seek games that can educate themselves.

Therefore, there is a need for an original board game that takes less time and incorporates subject matter from current American politics.

SUMMARY

The present general inventive concept provides a bankruptcy board game.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing a bankruptcy board game, including a game board, including a plurality of spaces disposed on a perimeter of the game board, and a plurality of card retaining areas to receive cards thereupon, a spinner unit removably disposed on at least a portion of the game board to control a course of action of at least one player during a game, and a plurality of figurines to move around the plurality of spaces and represent a position of the at least one player on the game board.

The spinner unit may include a spinning wheel, a spin button connected to the spinning wheel, and a motor connected to the spinning wheel to move the spinning wheel from horizontal in a first position to at least partially angled with respect to the spinner unit in a second position in response to a first depress of the spin button, and to rotate the spinning wheel in response to a second depress of the spin button.

The spinner unit may further include a card reader disposed on at least a portion of the spinner unit to scan a magnetic strip on at least one card from the plurality of card retaining areas in response to the at least one card being moved therethrough, a chip reader disposed on at least a portion of the spinner unit to scan a chip on the at least one card from the plurality of card retaining areas in response to the at least one card being inserted therein, and a speaker disposed on at least a portion of the spinner unit to recite words on the at least one card in response to the card reader scanning the magnetic strip on the at least one card.

The spinner unit may further include a control unit disposed within at least a portion of the spinner unit to perform arithmetic operations for the at least one player in response to at least one of the chip on the at least one card being inserted into the chip reader and events that occur during the game.

The bankruptcy board game may further include a rule adjuster disposed on at least a portion of the game board to change rules and events of the game in response to the number of players currently playing.

BRIEF DESCRIPTION OF THE DRAWINGS

These and/or other features and utilities of the present generally inventive concept will become apparent and more readily appreciated from the following description of the embodiments, taken in conjunction with the accompanying drawings of which.

DETAILED DESCRIPTION

Figure 1:
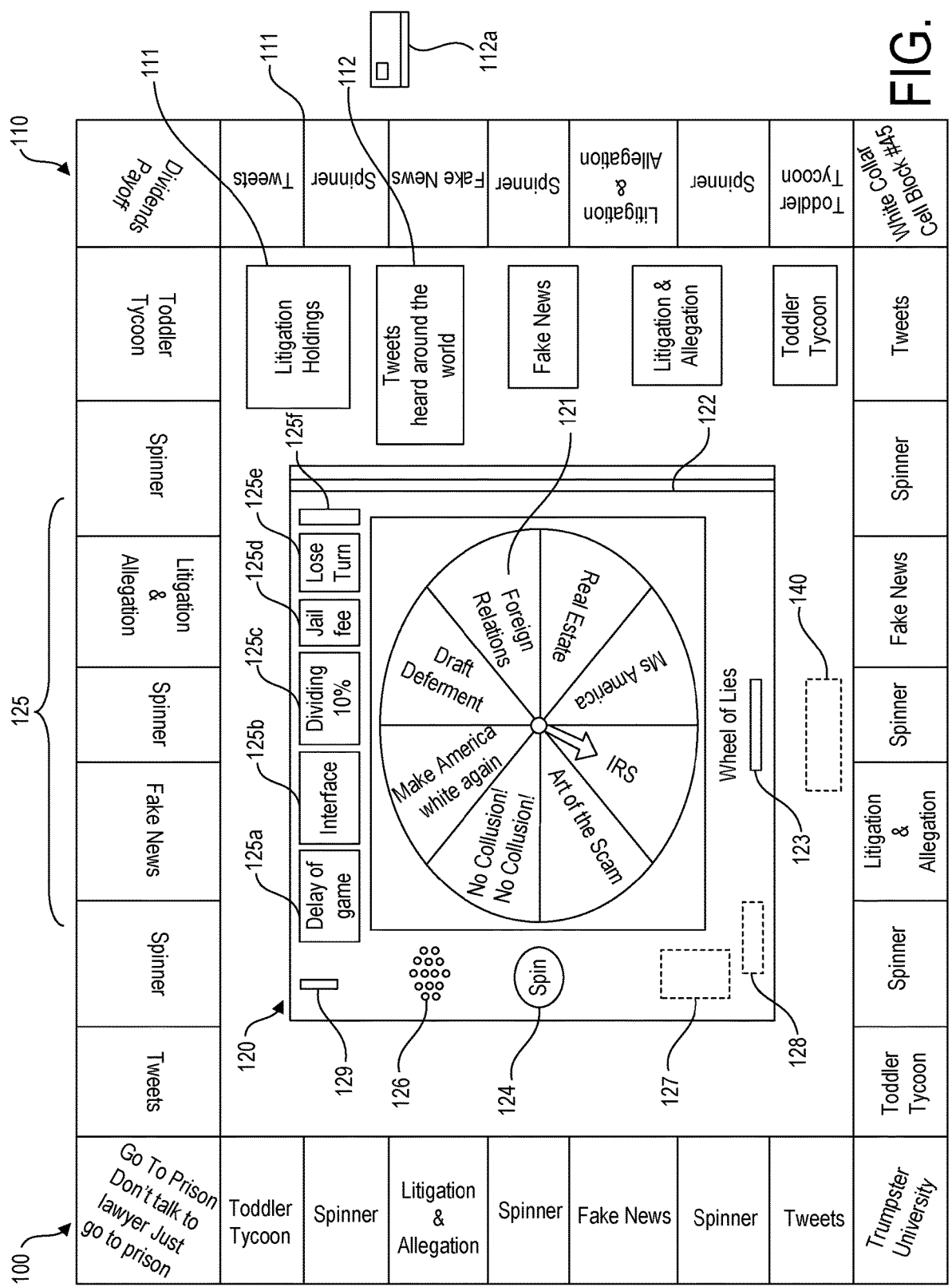
FIG. 1 illustrates a top view of a bankruptcy board game, according to an exemplary embodiment of the present general inventive concept.

Various example embodiments (a.k.a., exemplary embodiments) will now be described more fully with reference to the accompanying drawings in which some example embodiments are illustrated. In the figures, the thicknesses of lines, layers and/or regions may be exaggerated for clarity.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosure. Like numbers refer to like/similar elements throughout the detailed description.

It is understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.
}

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art. However, should the present disclosure give a specific meaning to a term deviating from a meaning commonly understood by one of ordinary skill, this meaning is to be taken into account in the specific context this definition is given herein.

LIST OF COMPONENTS

Bankruptcy Board Game 100
Game Board 110
Spaces 111
Card Retaining Areas 112
Spinner Unit 120
Spinning Wheel 121
Card Reader 122
Chip Reader 123
Spin Button 124
Action Buttons 125
Delay Game Button 125*a*
Inheritance Button 125*b*
Dividends Button 125*c*
Jail Fee Button 125*d*
Lose Turn Button 125*e*
Speaker 126
Motor 127
Control Unit 128
Power Source 129
Figurines 130
Rule Adjuster 140

FIG. 1 illustrates a top view of a bankruptcy board game 100, according to an exemplary embodiment of the present general inventive concept.

Figure 2:
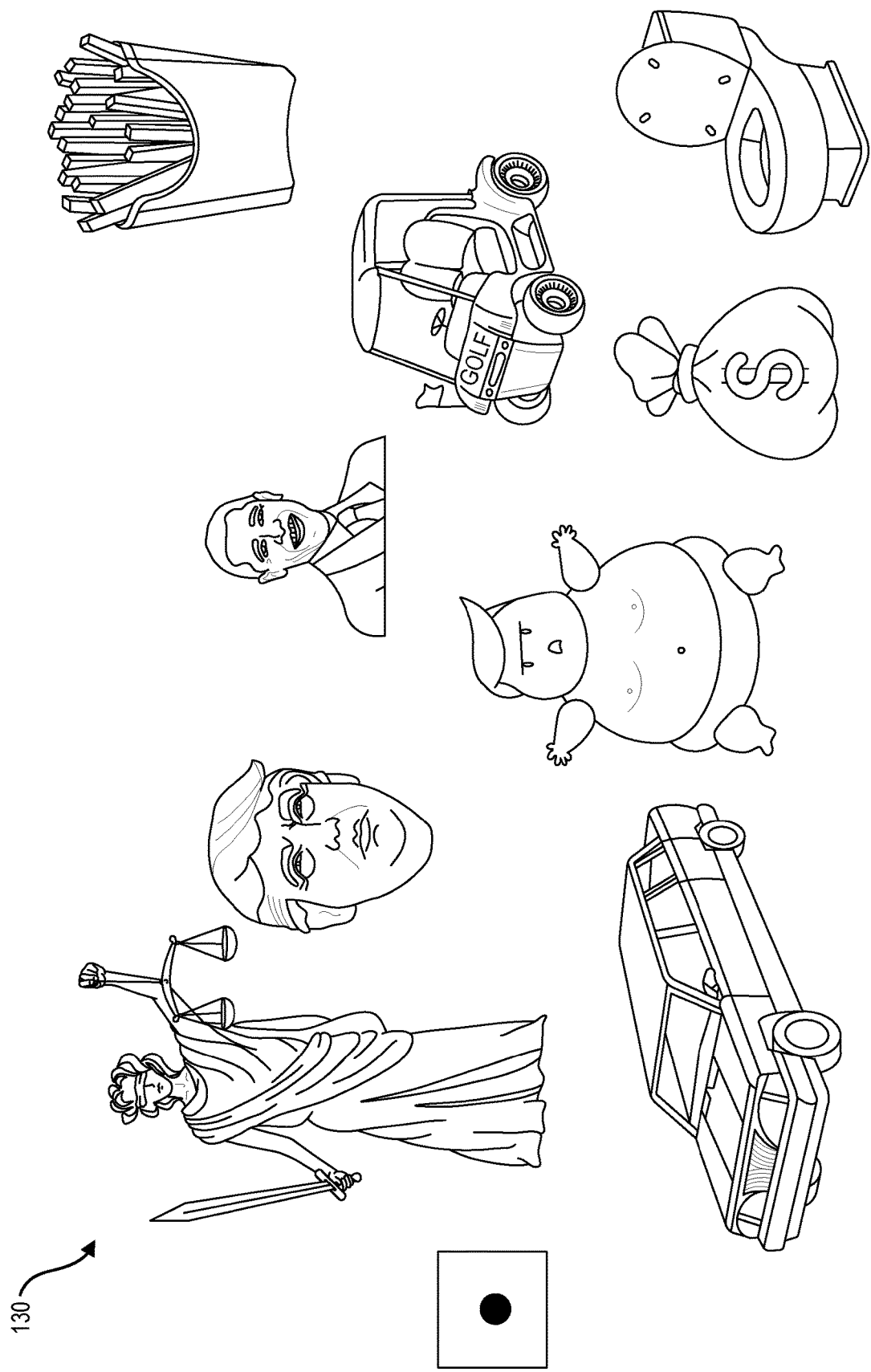
FIG. 2 illustrates a plurality of figurines, according to an exemplary embodiment of the present general inventive concept.

FIG. 2 illustrates a plurality of figurines 130, according to an exemplary embodiment of the present general inventive concept.

The bankruptcy board game 100 may be constructed from at least one of metal, plastic, cardboard, wood, rubber, or any other material known to one of ordinary skill in the art.

The bankruptcy board game 100 may include a game board 110, a spinner unit 120, and a plurality of figurines 130, but is not limited thereto.

Referring to FIG. 1, the game board 110 is illustrated to have a rectangular shape. However, the game board 110 may be a rectangular prism, circular, conical, triangular, pentagonal, hexagonal, heptagonal, octagonal, or any other shape known to one of ordinary skill in the art, but is not limited thereto.

The game board 110 may include a plurality of spaces 111 and a plurality of card retaining areas 112, but is not limited thereto.

The game board 110 may be a cardboard based board. Alternatively, the game board 110 may be a rectangular prism that includes electronic components therein to activate functions within the game board 110.

The plurality of spaces 111 may be disposed on each side of the game board 110. More specifically, the plurality of spaces 11 may be disposed on a perimeter of the game board 110. Each of the plurality of spaces 111 may include different words corresponding to different rules or actions to be taken by at least one player. For example, a dividends pay off space may cause the at least one player to gain interest according to a current wealth of the at least one player, a go to jail space directs the at least one player to move to jail, a white collar cell block forty-five space is a visitor's area, and a trumpster university space causes the at least one player to lose wealth and lose a turn.

The plurality of card retaining areas 112 may include tweets heard around the world, fake news, litigation and allegation, and toddler tycoon, but is not limited thereto.

Each of the plurality of card retaining areas 112 may receive cards 112*a* thereupon.

Furthermore, other spaces of the plurality of spaces 111 may direct the at least one player to draw at least one card 112*a* from at least one of the plurality of card retaining areas 112. As such, a card drawn event may occur in response to the at least one player drawing the at least one card 112*a* from at least one of the plurality of card retaining areas 112. For example, tweets heard around the world may include information from social media by a President and results in the at least one player losing or gaining wealth, fake news may include stories regarding the President and results in the at least one player losing or gaining wealth, litigation and allegation may include litigation outcomes against the President and results in the at least one player losing or gaining wealth, and toddler tycoon may include business dealing related to the President and results in the at least one player losing or gaining wealth.

Also, each card 112*a* may include a magnetic strip and/or a chip containing information related to the card 112*a* thereon.

The spinner unit 120 may include a spinning wheel 121, a card reader 122, a chip reader 123, a spin button 124, a plurality of action buttons 125, a speaker 126, a motor 127, a control unit 128, and a power source 129, but is not limited thereto.

The spinning wheel 121 may be removably disposed on at least a portion of a center the game board 110. However, the spinning wheel 121 may be detached and disposed anywhere near the at least one player. Additionally, the spinning wheel 121 may be referred to as a "Wheel of Lies" that includes categories such as foreign relations, art of the deal/scam, draft deferment, make America great/white again, IRS, Ms. America pageants, real estate, and no collusion. Moreover, foreign relations may cause the at least one player to lose money (e.g., $50,000) from tariffs and war with tweets on social media, art of the deal/scam may cause the at least one player to gain money (e.g., $10,000), draft deferment may cause the at least one player to gain money (e.g., $20,000), make America great/white again may cause the at least one player to lose money (e.g., $15,000) for being sued due to child labor for making hats, IRS may cause the at least one player to gain money (e.g., $100,000) for not paying taxes, Ms. America pageants may cause the at least one player to lose money (e.g., $35,000) for allegations against the President and silencing enemies, real estate may cause the at least one player to lose or gain money (e.g., $50,000), and no collusion may cause the at least one player to gain money from other countries (e.g., a set of money totaling $75,000).

The card reader 122 may be disposed on at least a portion of the spinner unit 120. The card reader 122 may scan the magnetic strip on the at least one card 112*a* in response to the at least one card 112*a* being moved (i.e. swiped) therethrough.

The chip reader 123 may be disposed on at least a portion of the spinner unit 120. The chip reader 123 may scan the chip on the at least one card 112*a* in response to the at least one card 112*a* being inserted therein.

The spin button 124 may rotate the spinning wheel in response to being depressed. In other words, the spinning wheel 121 may rotate in a first direction (i.e. clockwise) or a second direction (i.e. counterclockwise) in response to depressing the spin button 124.

During play of the game, the spin button 124 may be depressed in response to the at least one player landing on at least one of the plurality of spaces 111 showing an image of the President with a wheel in a mouth of the President.

The plurality of action buttons 125 may include a delay game button 125a, an inheritance button 125b, a dividends button 125c, a jail fee button 125d, a lose turn button 125e, and a no collusion button 125f, but is not limited thereto.

The delay game button 125a may cause the at least one player to gain $1,000 for delaying the game (e.g., at beginning of game) in response to being depressed.

The inheritance button 125b may cause the at least one player to gain $5,000,000 from an inheritance (e.g., after escaping litigation) in response to being depressed.

The dividends button 125c may cause the at least one player to gain interest based on a predetermined interest rate, according to the current wealth of the at least one player in response to being depressed.

The jail fee button 125d may cause the at least one player to lose money (i.e. pay off legal fees) in response to being depressed. In this case, the at least one player may get out of jail based on a predetermined legal fee.

The lose turn button 125e may cause the at least one player to lose money (e.g., from trumpster university) and lose a turn.

The no collusion button 125f may cause the at least one player to gain money (e.g., interest from other countries) in response to being depressed.

The speaker 126 may emit a sound in response to actions taken during the game. For example, the speaker 126 may recite words on the at least one card 112a and an outcome (e.g., gaining money, losing money) in response to the card reader 122 scanning the magnetic strip on the at least one card 112a.

The motor 127 may be disposed within at least a portion of the spinner unit 120. The motor 127 may rotate the spinning wheel 121 a predetermined number of times and/or a predetermined duration of time in response to the spin button 124 being depressed. Also, the motor 127 may move the spinning wheel 121 from a horizontal position to at least partially vertical (i.e. angled with respect to the spinner unit 120) in response to a first press of the spin button 124. In other words, the spinning wheel 121 may move from flush (i.e. horizontal) with the spinner unit 120 in a first position to at least partially angled with respect to the spinner unit 120 in a second position. Subsequently, the spinning wheel 121 may rotate in response to at least one subsequent depress of the spin button 124. After use, spinning wheel 121 may be depressed back within the spinner unit 120 from the second position to the first position.

The control unit 128 may include a processing unit and a storage unit, but is not limited thereto.

The processing unit (or central processing unit, CPU) may include electronic circuitry to carry out instructions of a computer program by performing basic arithmetic, logical, control and input/output (I/O) operations specified by the instructions. The processing unit may include an arithmetic logic unit (ALU) that performs arithmetic and logic operations, processor registers that supply operands to the ALU and store the results of ALU operations, and a control unit that fetches instructions from memory and "executes" them by directing the coordinated operations of the ALU, registers and other components. The processing unit may also include a microprocessor and a microcontroller.

The storage unit may include a random access memory (RAM), a read-only memory (ROM), a hard disk, a flash drive, a database connected to the Internet, cloud-based storage, Internet-based storage, or any other type of storage unit.

As such, the control unit 128 may keep track of monetary amounts of each player. Additionally, the control unit 128 keeps track of a number of players and a current turn of the players. More specifically, the control unit 128 may track the gain and/or loss of money for each player based on events that occur during the game, as described above. Also, the control unit 128 may perform arithmetic operations (i.e. add and/or subtract money) for each player in response to the chip on the at least one card 112a being inserted into the chip reader 123.

The power source 129 may include a battery, a solar cell, and a power inlet (e.g., universal serial bus (USB)), but is not limited thereto.

The power source 129 may provide power to at least one of the spinning wheel 121, the card reader 122, the chip reader 123, the spin button 124, the plurality of action buttons 125, the speaker 126, the motor 127, and the control unit 128.

Therefore, the spinner unit 120 may control a course of action of the at least one player.

The plurality of figurines 130 may include playing pieces and dice, but is not limited thereto.

The plurality of figurines 130 may have any shape and/or design. For example, the plurality of figurines may be a golf cart, a fast food item, a golden toilet, a cell phone, a limousine, a silver spoon, a statute of liberty, a gavel, a women's march banner, an attorney, a constitution, and a competitor President. Also, the plurality of figurines 130 may be moved around the board based on rolls of dice, such that the plurality of figurines represent a position of the at least one player on the game board 110.

The rule adjuster 140 may include another processing unit and another storage unit, but is not limited thereto.

The rule adjuster 140 may change rules and events of the game in response to the number of players currently playing. For example, two players may have more money loss and gained compared to four players currently playing.

To begin play, all players place a set, corresponding to the number of players, of the plurality of figurines 130 on the litigation holdings space of the plurality of spaces 111. The players roll dice until doubles is rolled (i.e. two dice having the same number on each face). The at least one player may depress the delay game button 125a in response to not rolling doubles. The at least one player may depress the inheritance button 125b in response to rolling doubles nay move to the dividends pay off space of the plurality of spaces 111. All players are required to earn the inheritance before all players can continue the game.

Play continues with an oldest player moving first. Alternatively, all players can roll dice with lowest rolls moving first and highest rolls moving last. Play continues counterclockwise of the players with players moving based on dice rolls. The lose turn button 125e may be depressed in response to rolling doubles on dice. The game ends in response to the control unit 128 determining the at least one player has gone bankrupt.

Therefore, the bankruptcy board game 100 may entertain players based on deceit between players and learning about American politics.

The present general inventive concept may include a bankruptcy board game 100, including a game board 110, including a plurality of spaces 111 disposed on a perimeter of the game board 110, and a plurality of card retaining areas 112 to receive cards 112a thereupon, a spinner unit 120 removably disposed on at least a portion of the game board 110 to control a course of action of at least one player during a game, and a plurality of figurines 130 to move around the plurality of spaces 111 and represent a position of the at least one player on the game board 110.

The spinner unit 120 may include a spinning wheel 121, a spin button 124 connected to the spinning wheel 121, and a motor 127 connected to the spinning wheel 121 to move the spinning wheel 121 from horizontal in a first position to at least partially angled with respect to the spinner unit 120 in a second position in response to a first depress of the spin button 124, and to rotate the spinning wheel 121 in response to a second depress of the spin button 124.

The spinner unit 120 may further include a card reader 122 disposed on at least a portion of the spinner unit 120 to scan a magnetic strip on at least one card 112a from the plurality of card retaining areas 112 in response to the at least one card 112a being moved therethrough, a chip reader 123 disposed on at least a portion of the spinner unit 120 to scan a chip on the at least one card 112a from the plurality of card retaining areas 112 in response to the at least one card 112a being inserted therein, and a speaker 126 disposed on at least a portion of the spinner unit 120 to recite words on the at least one card 112a in response to the card reader 122 scanning the magnetic strip on the at least one card 112a.

The spinner unit 120 may further include a control unit 128 disposed within at least a portion of the spinner unit 120 to perform arithmetic operations for the at least one player in response to at least one of the chip on the at least one card 112a being inserted into the chip reader 123 and events that occur during the game.

The bankruptcy board game 100 may further include a rule adjuster 140 disposed on at least a portion of the game board 110 to change rules and events of the game in response to the number of players currently playing.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

The invention claimed is:

1. A bankruptcy board game, comprising:
    a game board, comprising:
        a plurality of spaces disposed on a perimeter of the game board, and
        a plurality of card retaining areas to receive cards thereupon;
    a spinner unit removably disposed on at least a portion of the game board to control a course of action of at least one player during a game, the spinner unit comprising:
        a spinning wheel,
        a spin button connected to the spinning wheel, and
        a motor connected to the spinning wheel to move the spinning wheel from horizontal in a first position to at least partially angled with respect to the spinner unit in a second position in response to a first depress of the spin button, and to rotate the spinning wheel in response to a second depress of the spin button; and
    a plurality of figurines to move around the plurality of spaces and represent a position of the at least one player on the game board.

2. The bankruptcy board game of claim 1, wherein the spinner unit further comprises:
    a card reader disposed on at least a portion of the spinner unit to scan a magnetic strip on at least one card from the plurality of card retaining areas in response to the at least one card being moved therethrough;
    a chip reader disposed on at least a portion of the spinner unit to scan a chip on the at least one card from the plurality of card retaining areas in response to the at least one card being inserted therein; and
    a speaker disposed on at least a portion of the spinner unit to recite words on the at least one card in response to the card reader scanning the magnetic strip on the at least one card.

3. The bankruptcy board game of claim 2, wherein the spinner unit further comprises:
    a control unit disposed within at least a portion of the spinner unit to perform arithmetic operations for the at least one player in response to at least one of the chip on the at least one card being inserted into the chip reader and events that occur during the game.

4. The bankruptcy board game of claim 1, further comprising:
    a rule adjuster disposed on at least a portion of the game board to change rules and events of the game in response to the number of players currently playing.

* * * * *